United States Patent
Perhacs

[19]

[11] Patent Number: 5,809,618
[45] Date of Patent: Sep. 22, 1998

[54] TIGHTENER FOR A LINE

[76] Inventor: Les Perhacs, 2540 Wilt Rd., Fallbrook, Calif. 92028

[21] Appl. No.: 877,190

[22] Filed: Jun. 17, 1997

[51] Int. Cl.⁶ .............................. A44B 21/00; A44C 11/00
[52] U.S. Cl. ............................ 24/71.1; 24/129 R; 24/910; 242/338.4; D8/44
[58] Field of Search .................................. 24/71.1, 68 D, 24/68 F, 68 E, 68 R, 129 R, 129 A, 129 C, 910, 68 CD; 256/40, 41, 43, 44; 242/338.2, 338.4; D8/44; 16/114 B, 114 R

[56] References Cited

U.S. PATENT DOCUMENTS

| | | | |
|---|---|---|---|
| 6,546 | 7/1849 | Crawford | 24/910 X |
| 164,910 | 6/1875 | Duffy | 24/910 X |
| 515,340 | 2/1894 | Judd . | |
| 550,970 | 12/1895 | Hemenway | 24/71.1 |
| 625,453 | 5/1899 | Martz . | |
| 1,215,391 | 2/1917 | Lofquist . | |
| 1,586,174 | 5/1926 | Bell . | |
| 1,663,182 | 3/1928 | Semmler . | |
| 1,725,130 | 8/1929 | Ciferskor . | |
| 2,478,994 | 8/1949 | White | 24/71.1 X |
| 2,679,082 | 5/1954 | Himberger | 24/71.1 |
| 3,252,189 | 5/1966 | Kanneworff et al. | 24/71.1 |
| 3,400,870 | 9/1968 | Vietri | 16/114 R |
| 3,711,901 | 1/1973 | Close | 242/388.4 X |
| 3,858,279 | 1/1975 | Brattstrom | 24/68 F |
| 3,875,638 | 4/1975 | Langlie et al. | 242/388.2 X |
| 3,879,805 | 4/1975 | Gretter | 24/71.1 |
| 4,222,157 | 9/1980 | Forman | 24/129 A |
| 5,426,827 | 6/1995 | Tracey et al. | 24/68 C |

*Primary Examiner*—Randolph A. Reese
*Assistant Examiner*—Robert J. Sandy
*Attorney, Agent, or Firm*—Nydegger & Associates

[57] ABSTRACT

A tightener for tightening a line which extends between two points is provided herein. The tightener includes a housing, a retainer, and a deflector. The housing is movable between a first position and a second position to tighten the line. The retainer is adapted for selectively retaining a selected portion of an extra length of line between the two points. The deflector moves with the housing and is adapted for deflecting the line during movement of the housing to the second position. The tightener is particularly useful with devices that require an adjustable line, such as a portable carrying device, a tie-down device or a tent.

20 Claims, 4 Drawing Sheets

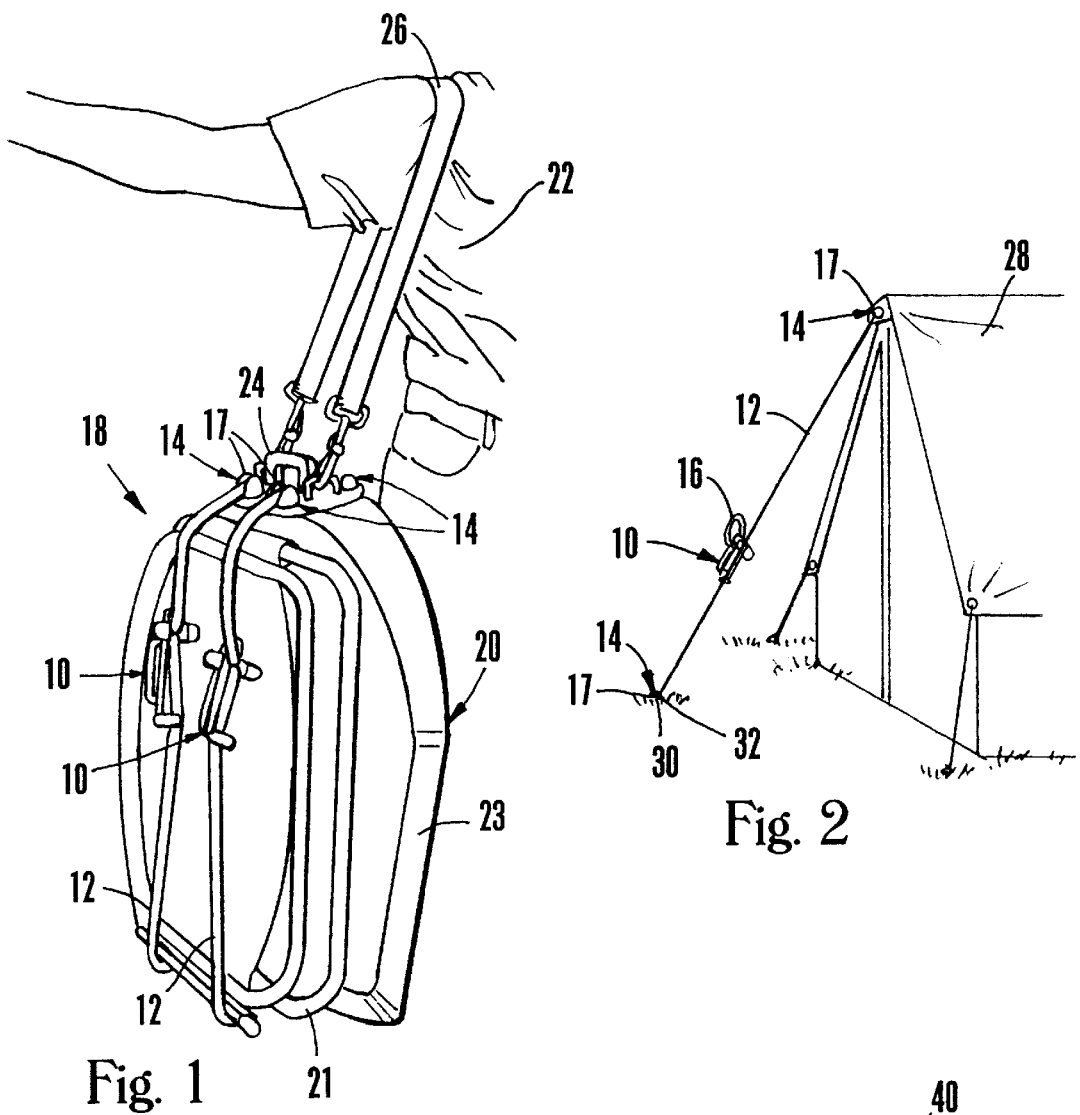
Fig. 1
Fig. 2
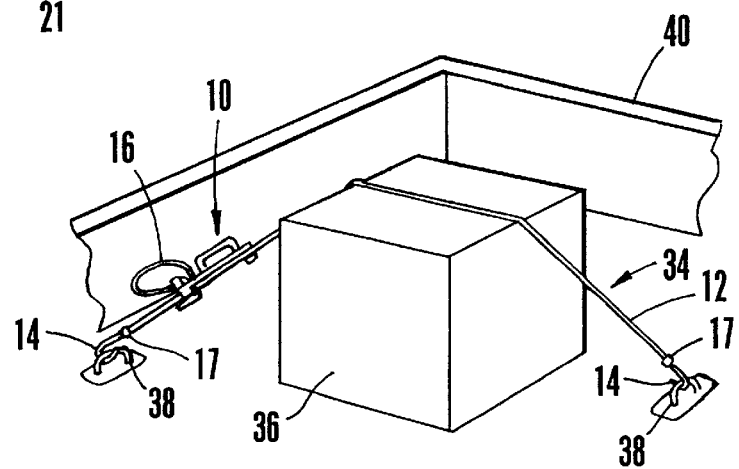
Fig. 3

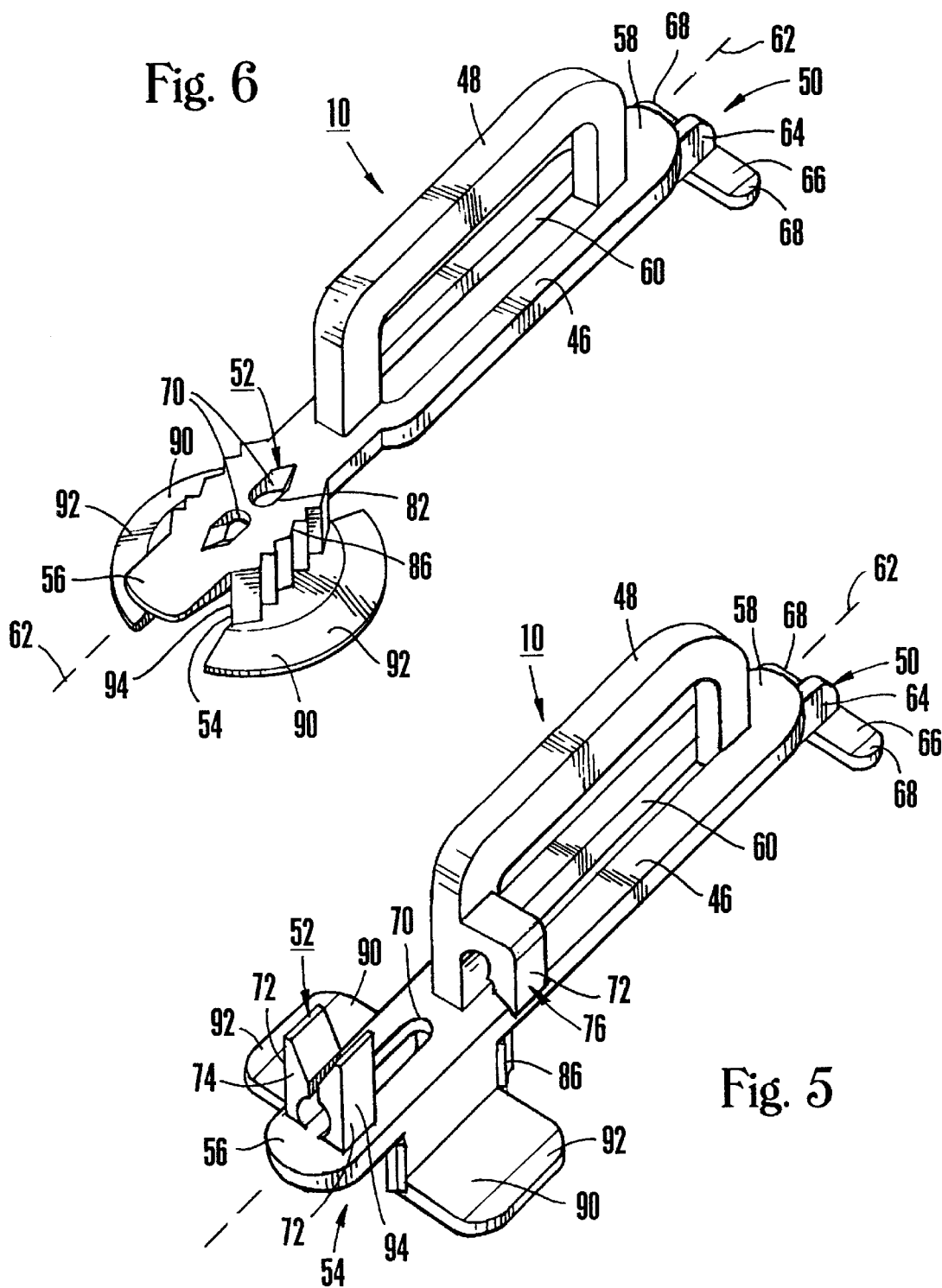

TIGHTENER FOR A LINE

FIELD OF THE INVENTION

The present invention generally relates to a carrying device which uses at least one (1) line to carry one (1) or more items. More specifically, the present invention relates to a tightener for selectively tightening a line which can be used with the carrying device.

BACKGROUND

It is known that carrying devices can be used to facilitate carrying one (1) or more items. For example, these carrying devices can be used to carry firewood, beach gear or other items.

One type of carrying device uses a line that is wrapped around the items and stretched between two (2) points. For this type of carrying device, a tightening device can be used to tighten or take up slack in the line around the items.

However, this type of carrying device has proved not to be entirely satisfactory because the tightening device is often difficult to use. Further, the tightening device provides only a limited range of line adjustment, is difficult to manufacture, and does not provide a securely tightened line. Moreover, many of these tightening devices cannot be added to an existing line without modifying the attachment of the line and/or disconnecting the line.

Other carrying devices use hook and loop type fasteners to adjust the line length. With these carrying devices, it is very difficult to get sufficient tension in the line to tightly retain the items and there is a risk that the hook and loop type fastener will fail.

In light of the above, it is an object of the present invention to provide a device for tightening a line which reliably retains the line and is substantially, infinitely adjustable. Another object of the present invention is to provide a tightening device which is relatively easy to use and can be easily added to an existing line to tighten the line. Yet, another object of the present invention is to provide a tightening device which is lightweight and relatively inexpensive to manufacture. Still another object of the present invention is to provide a device for tightening a line which can be used in conjunction with a carrying device to securely carry a number of irregularly shaped items.

SUMMARY

The present invention is directed to a tightener for tightening or taking up slack in a line which extends between two points that meets these needs. The tightener provided herein includes a housing, a retainer, and a deflector. The tightener is movable between a first position where the line is pre-tensioned and a second position where the tightener tensions the line to the desired tension.

The term "line" as used herein means and includes rope, string, cord, wire, cable or any similar flexible line.

The term "extra length of line" as used herein means and includes any slack line which exists when the line extends between the two (2) points.

The retainer is adapted for retaining a selected portion of the extra length of line between the two (2) points. Thus, the retainer selectively compensates for the amount of extra length of line. The retainer includes a retainer aperture that is adapted for receiving the selected portion of the extra length of line. Typically, the retainer aperture extends through the housing into the deflector. In one (1) embodiment, the retainer aperture can comprise a pair of retainer slots which extend through the housing into the deflector. In this embodiment, each of the retainer slots is sized and adapted to partly inhibit the movement of the line through the retainer slot. Alternately, the retainer can include at least one (1) retaining tab for retaining the selected portion of the extra length of line.

The deflector moves with the housing and the tightener, and is adapted for deflecting the line during movement of the housing to the second position. Typically, the deflector includes a channel for receiving the line and bending the line during movement of the tightener.

Preferably, the tightener includes a latch for retaining the housing in the second position. This allows the tightener to maintain the line in a tightened condition. Further, the tightener can include a tightener handle which facilitates rotation of the housing between the first position and the second position.

As provided in detail below, the tightener is particularly useful with a carrying device for carrying a number of irregularly shaped items. Additionally, the tightener can, for example, be used for tightening a line of a tent or as part of a tie-down device.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a perspective view of a carrying device having features of the present invention;

FIG. 2 is a perspective view of a tent having features of the present invention;

FIG. 3 is a perspective view of a tie-down device having features of the present invention;

FIG. 5 is a perspective view of a first embodiment of a tightener having features of the present invention;

FIG. 6 is a perspective view of a second embodiment of a tightener having features of the present invention.

DESCRIPTION

Figure 4:
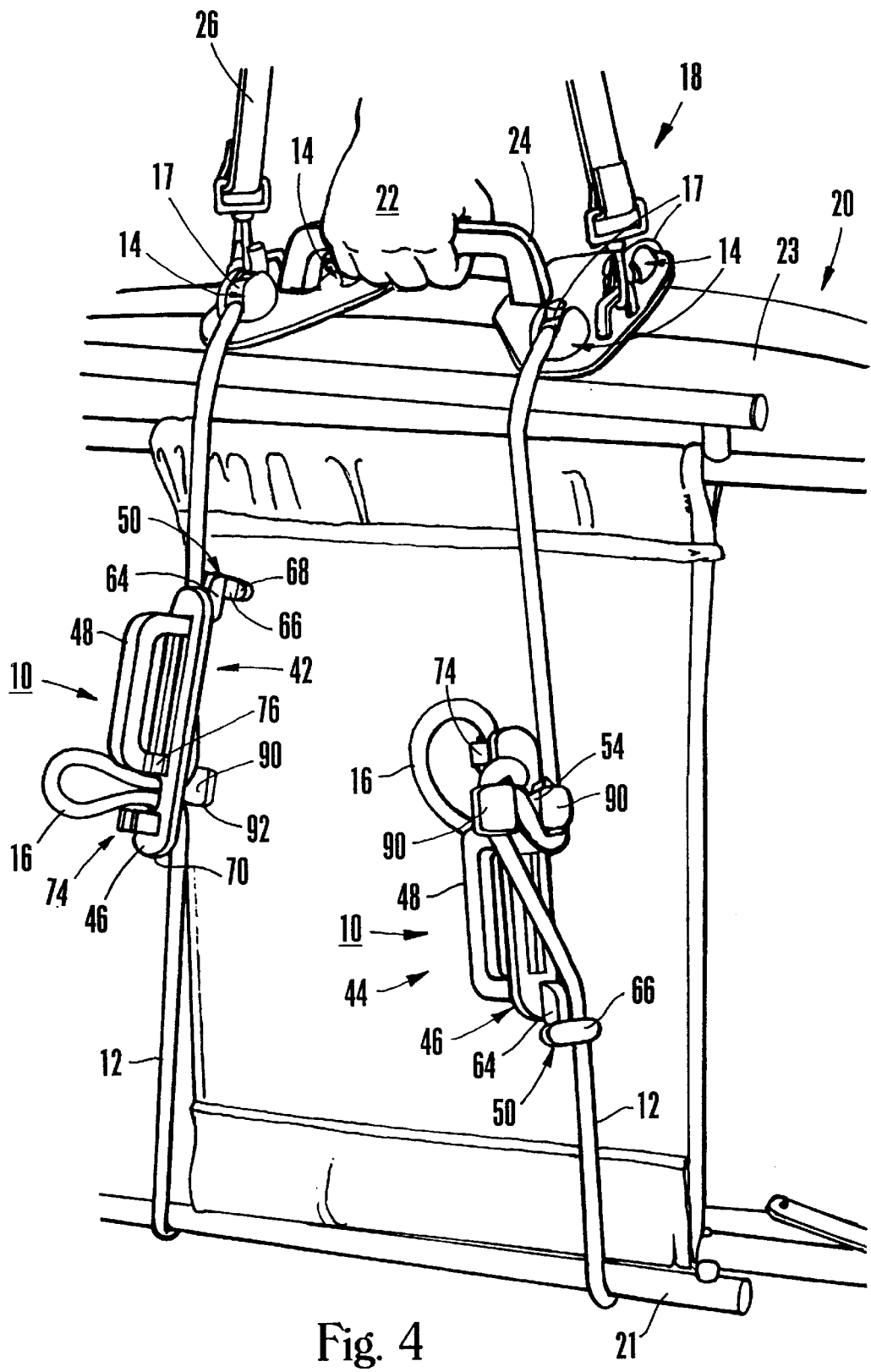
FIG. 4 is an enlarged perspective view of a portion of the carrying device of FIG. 1.

Referring initially to FIG. 1, a tightener 10 for tightening a line 12 which extends between two (2) points 14 is provided herein. As provided in detail below, the unique design of the tightener 10 allows the tightener 10 to easily and selectively adjust the effective length of the line 12 between the two (2) points 14.

The tightener 10 can be used in a number of situations to tighten a line 12. For example, the tightener 10 is particularly useful for tensioning a line 12 having an extra length of line 16 between the two (2) points 14. The term "extra length of line" 16 as used herein means and includes any slack line which exists between ends 17 of the line 12 or between the two (2) points 14 from which the line 12 extends.

The term "two (2) points" 14 as used herein means where the line 12 is attached. It is important to recognize that the ends 17 of the line 17 could be attached together or the line 12 can be continuous. For this embodiment, the two (2) points 14 are at the same proximate location.

FIG. 1 shows that a pair of tighteners 10 and a pair of lines 12 can be used as part of a carrying device 18 for easily carrying a number of irregularly shaped items 20. In this embodiment, each tightener 10 adjusts the effective length of one (1) of the lines 12 to fit and secure the items 20 to be carried by the carrying device 18. As shown in FIG. 1, the carrying device 18 can be used by a human 22 to easily carry items 20, such as a beach chair 21, and a wave board 23. Alternately, the carrying device 18 can be used for carrying other irregularly shaped items 20 including a surfboard (not shown), flippers (not shown) or firewood (not shown).

In the embodiment shown in FIG. 1, the carrying device 18 includes, in addition to the tighteners 10 and lines 12, a transport handle 24 and a carrying strap 26. The transport handle 24 and the carrying strap 26 facilitate transport of the carrying device 18 by the human 22. For the embodiment shown in FIG. 1, the ends 17 of each line 12 are attached to the transport handle 24 and the transport handle 24 defines the two (2) points 14 in which each line 12 extends.

FIG. 2 shows that the tightener 10 can be used with a tent 28 to tighten the lines 12 which hold up the tent 28. In this embodiment, one (1) of the two (2) points 14 is a stake 30 secured to the ground 32 while the other of the two (2) points 14 is the tent 28.

FIG. 3 shows the tightener 10 used with a tie-down device 34 to secure an object 36, such as a box for transport. In this embodiment, each of the two (2) points 14 can be a hook 38 which is secured to a vehicle 40, such as a car (not shown), truck (not shown), motorcycle (not shown), bicycle (not shown), or a boat (not shown).

Referring to FIG. 4, the tightener 10 moves or rotates between a first position 42, shown on the left in FIG. 4 and a second position 44, shown on the right in FIG. 4 (partly rotated for clarity) to tighten the line 12. In the first position 42, the line 12 is typically, partly loose and the extra length of line 16 can be adjusted to pre-tension the line 12. In the second position 44, the line 12 is typically, substantially tightened or tensioned.

The amount of movement of the tightener 10 from the first position 42 to the second position 44 varies according to the design of the tightener 10. In the embodiment shown in FIG. 4, the tightener 10 is designed to rotate approximately one hundred and eighty degrees (180°) from the first position 42 to the second position 44. Alternately, it is anticipated that the tightener 10 could be designed to be rotated, for example, approximately ninety degrees (90°) or three hundred and sixty degrees (360°) between the first position 42 and the second position 44. Further, it is anticipated that the tightener 10 could be designed to be moved, for example, to a third position (not shown) and a fourth position (not shown).

Importantly, the direction of rotation of the tightener 10 shown in the Figures is not important. For example, referring to FIG. 4, the tightener 10 is rotated in the clockwise direction from the first position 42 to the second position 44. However, the tightener 10 could alternately be rotated in a counterclockwise direction from the first position 42 to the second position 44.

As can best be seen in FIGS. 5 and 6, the tightener 10 includes a housing 46, a tightener handle 48, a latch 50, a retainer 52, and a deflector 54. For the embodiments shown in these Figures, the housing 46 is an elongated strip which interconnects the retainer 52, the deflector 54, the tightener handle 48 and the latch 50, and includes a housing proximal end 56 and a housing distal end 58. Further, the elongated strip can include a housing opening 60 which facilitates manufacturing of the tightener 10 as a one (1) piece, integral component. Alternately, instead of an elongated strip, the housing 46 can be some other shape, such as a disk.

Referring back to FIG. 4, in addition to retaining the components of the present invention, the housing 46 also prevents interference between the tightener handle 48 and the line 12 during rotation of the tightener 10 between the first position 42 and the second position 44. This allows for smooth movement of the tightener 10 between the first position 42 and the second position 44.

The housing 46 can also include a housing longitudinal axis 62 which is substantially aligned with the line 12, when the housing 46 is in the first position 42. Subsequently, when the housing 46 is rotated approximately one hundred and eighty degrees (180°) to the second position 44, the housing longitudinal axis 62 is again substantially aligned with the line 12.

The tightener handle 48 facilitates movement of the tightener 10 between the first position 42 and the second position 44. The tightener handle 48 is suited for being engaged with a human hand to facilitate rotation of the tightener 10. As can be seen in FIGS. 5 and 6, the tightener handle 48 can be an inverted "U" shaped member that is attached to the housing 46 and extends between proximate the housing distal end 58 and proximate the housing proximal end 56. Alternately, for example, the tightener handle 48 can be a ball shaped projection (not shown) which extends away from the housing 46 proximate the housing distal end 58.

The latch 50 selectively retains the tightener 10 in the second position 44. The latch 50 can be implemented in a number of alternate ways. As shown in FIG. 4, the latch 50 can hook over the line 12 to retain the tightener 10 in the second position 44. In this embodiment, the latch 50 is an inverted "T" shaped projection which extends downward from the housing 46 proximate the housing distal end 58. Stated another way, the latch 50 includes a latch projection 64 which extends downward and substantially perpendicular from the housing 46 and a latch cross-member 66 which is transverse to the latch projection 64 and substantially parallel with the housing 46. In the embodiment, the latch projection 64 is moved over the line 12 and is retained in the second position 44 by the latch cross-member 66. Preferably, the latch cross-member 66 includes tapered edges 68 to facilitate engagement with the line 12 and minimize wear on the line 12.

It should be noted that the design of the latch 50 shown in FIGS. 5 and 6, allows the latch 50 to engage the line 12 irregardless of the direction of rotation of the tightener 10. Further, it should be noted that in the embodiment shown in FIGS. 5 and 6, the latch projection 64 extends past the housing distal end 58 for ease of manufacturing of the tightener 10 as an integral unit.

The retainer 52 retains a selected portion of the extra length of line 16 to substantially pre-tension the line 12. Basically, the retainer 52 allows the tightener 10 to tighten the line 12 irregardless of the amount of extra length of line 16 which exists between the two (2) points 14. This allows the present tightener 10 to be used in situations where there is under one (1) inch of extra length of line 16 and in situations where there is significantly more extra length of line 16.

The retainer 52 can be implemented in a number of alternate ways. For example, as shown in FIG. 5, the retainer 52 includes a retainer aperture 70 and retaining tabs 72 for selectively retaining the line 12. The retainer aperture 70 is sized and adapted to receive the line 12. Accordingly, the size and shape of the retainer aperture 70 varies according to the size and shape of the line 12. In the embodiment shown in FIG. 5, the retainer aperture 70 is oval shaped and extends through the housing 46. Alternately, for example, the retainer aperture 70 could extend through the deflector 54 or some other component of the tightener 10.

The retaining tabs 72 retain the selected portion of extra length of line 16 to pre-tension the line 12. The embodiment shown in FIG. 5 includes a first set 74 and a second set 76 of retaining tabs 72 which are designed to retain the line 12. The first set 74 of retaining tabs 72 is positioned proximate the housing proximal end 56 while the second set 76 of retaining tabs 72 is proximate the tightener handle 48. The first set 74 of retaining tabs 72 project and extend away from the housing 46 and are spaced apart and adapted to receive the line 12. In contrast, the second set 76 is defined by a portion of the tightener handle 48 and an "L" shaped projection which extends away from the tightener handle 48.

Alternately, for example, a cylindrical projection (not shown) could be utilized and the line 12 could be wrapped around the cylindrical projection to retain the selected portion of the extra length of line 16.

Importantly, because the extra length of line 16 is retained by the retaining tabs 72, the tightener 10 can be added to the line 12 after the line 12 has been attached to the two (2) points 14. Thus, the tightener 10 can be easily added to an existing line 12.

In another embodiment, shown in FIG. 6, the retainer aperture 70 can be a pair of retainer slots 82 which extend through the housing 46. In this embodiment, each retainer slot 82 is sized and adapted so that the line 12 fits snugly into the retainer slot 82 to retain the line 12. Stated another way, each retainer slot 82 is slightly smaller than the cross-sectional area of the line 12, so that the line 12 fits snugly into the retainer slot 82. As shown in FIG. 6, each retainer slot 82 can be a partly diamond shaped.

The deflector 54 moves with the housing 46 and deflects the line 12 during movement of the tightener 10 to the second position 44. Basically, the deflector 54 operates by bending or folding the line 12 intermediate the two (2) points 14 during rotation to the second position 44. This causes the line 10 to tighten.

The design of the deflector 54 varies according to the design of the tightener 10 and line 12. As can best be seen with reference to FIGS. 4-7, the deflector 54 can include a pair of substantially parallel walls 86 which extend downward from the housing 46 proximate the housing proximal end 56 and the retainer 52. Importantly, referring to FIG. 7, the parallel walls 86 define a channel 88 for receiving the line 12 when the tightener 10 is in the first position 42. Rotation of the housing 46 to the second position 44 (shown in FIG. 4) causes the channel 88 to rotate approximately one hundred and eighty degrees (180°). This results in a portion of the line 12 being wrapped around each of the walls 86 and increased tension in the line 12.

Preferably, each wall 86 includes a lateral projection 90 which prevents the line 12 from slipping during movement of the tightener 10 to the second position 44. Further, a projection edge 92 of each lateral projection 90 can be tapered to facilitate movement of the tightener 10 and to protect the line 12.

Importantly, the shape and size of the deflector 54 can be varied to adjust the amount of tension which is applied to the line 12 upon rotation to the second position 44. For example, the length of the channel 88 can be increased to obtain more tension on the line 12 or the length of the channel 88 can be decreased to obtain less tension on the line 12. Further, it should be noted that the amount of pre-tension on the line 12, when the tightener 10 is in the first position 42, also determines the resulting tension on the line 12. Alternately, the amount of tension can be increased by designing the walls 86 to be convex (not shown).

Figure 7:
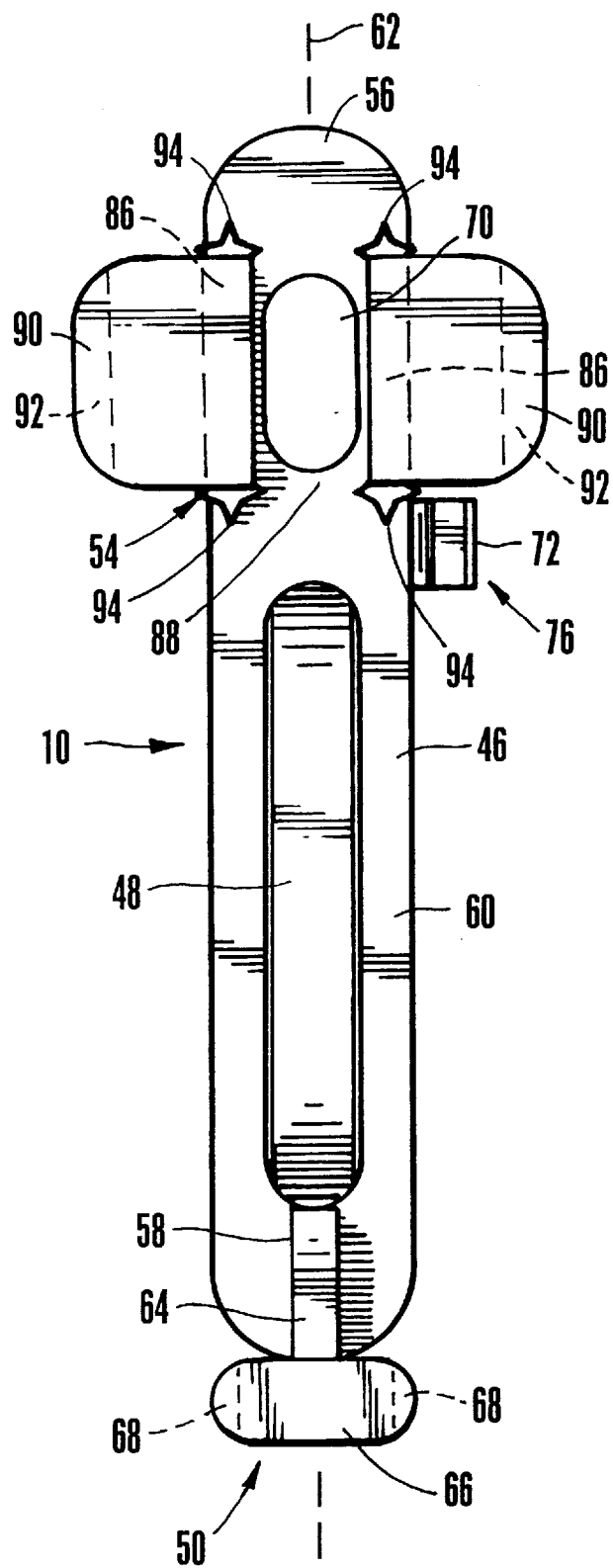
FIG. 7 is a bottom plan view of the tightener shown in FIG. 5.

Additionally, the walls 86 can include a plurality of spaced apart grippers 94 for inhibiting the line 12 from sliding. Referring to FIGS. 5-7, the grippers 94 are a number of ridges proximate the edges of the walls 86 which help retain the line 12. Alternately, for example, the walls 86 could utilize a rough outer surface to retain the line 12.

The tightener 10 is preferably made as an integral unit for ease of manufacturing and structural integrity. A suitable tightener 10 can be injection molded from high impact styrene, a polycarbonate or glass filled nylon. Alternately, the various components can be individually manufactured and glued together or manufactured from die stamped metal and folded.

Importantly, the unique design of the tightener 10 allows the tightener 10 to easily, reliably, and selectively adjust the effective length of the line 12 between the two (2) points 14. Further, the tighener 10 can be easily added to existing lines 12.

OPERATION

Operation of the present invention can best be understood with reference to FIG. 4. With the tightener 10 in the first position 42, the line 12 is pre-tensioned by moving the desired portion of the extra length of line 16 through the retainer aperture 70. In the embodiment shown in FIGS. 4 and 5, the first set 74 and second set 76 of retaining tabs 72 secure the selected extra length of line 16. Alternately, in the embodiment shown in FIG. 6, the retainer slots 82 retain the selected extra length of line 16.

Subsequently, with the desired amount of extra length of line 16 secured by the retainer 52, the tightener 10 is rotated to the second position 44, shown on the right in FIG. 4. This causes the deflector 54 to deflect and add tension to the line 12. The latch 50 retains the tightener 10 in the second position 44. Subsequently, the line 12 can be loosened by merely rotating the tightener 10 back to the first position 42. With the tightener 10 in the first position 42, the amount of extra length of line 16 retained by the retainer 52 can be easily modified. Next, the tighener 10 can be rotated back to the second position 44 to add tension to the line 12. The tightener 10 is easily moved between the first position 42 and the second position 44 with the tightener handle 48.

While the particular carrying device 18 and tightener 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A tightener for tightening a line which extends between two points, the line including an extra length positioned between the two points, the tightener comprising:

a housing movable between a first position and a second position;

a retainer which is attached to the housing, the retainer being adapted to pre-tension the line by securing at least a portion of the extra length, the retainer including a retainer aperture that is adapted for receiving the extra length; wherein, the amount of the extra length secured by the retainer is incrementally adjustable to adjust the amount of pre-tension on the line between the two points; and a deflector which moves with the housing and is adapted for deflecting the line between the two points during movement of the housing to the second position.

2. The tightener of claim 1 including a latch for retaining the housing in the second position.

3. The tightener of claim 1 wherein the tightener can be added to the line intermediate to the two points after the line extends between the two points.

4. The tightener of claim 1 wherein the retainer aperture comprises a pair of retainer slots which extend through the housing into the deflector, each retainer slot being sized so that the line fits snugly in each retainer slot to inhibit the movement of the extra length through the retainer slot.

5. The tightener of claim 1 wherein the retainer includes a pair of spaced apart retaining tabs which are adapted for selectively gripping and retaining the extra length between the pair of retaining tabs.

6. A carrying device including a line and the tightener of claim 1.

7. A tent including a line and the tightener of claim 1.

8. A tie-down device including a line and the tightener of claim 1.

9. A tightener for tightening a line which extends between two points, the line including an extra length positioned between the two points, the tightener comprising:

a housing movable from a first position to a second position to tighten the line;

a retainer which is attached to the housing, the retainer being adapted to pre-tension the line by securing at least a portion of the extra length, the retainer including a retainer aperture which extends through the housing and is adapted for receiving the extra length; wherein, the amount of extra length secured by the retainer is incrementally adjustable to adjust the amount of pre-tension on the line between the two points;

a deflector which includes a channel adapted for receiving the line, the deflector deflecting the line between the two points during movement of the housing to the second position to tighten the line; and a latch for retaining the housing in the second position.

10. The tightener of claim 9 wherein the tightener can be added to the line intermediate to the two points after the line extends between the two points.

11. The tightener of claim 9 wherein the retainer aperture comprises a pair of retainer slots which extend through the housing into the channel, each retainer slot being sized so that the line fits snugly in each retainer slot to inhibit the movement of the extra length through the retainer slot.

12. The tightener of claim 9 wherein the retainer includes two, pairs of spaced apart retaining tabs, each pair of retaining tabs being adapted for gripping and retaining the extra length between each pair of retaining tabs.

13. The tightener of claim 9 comprising a tightener handle which facilitates rotation of the housing between the first position and the second position.

14. A carrying device including a line and the tightener of claim 9.

15. A tent including a line and the tightener of claim 9.

16. A tie-down device including a line and the tightener of claim 9.

17. A method for tightening a line, the method comprising:

securing the line at two points, the line including an extra length between the two points;

positioning a tightener on the line between the two points, the tightener including a retainer and a deflector which are secured together;

pre-tensioning the line by securing a portion of the extra length with the retainer, the retainer including a retainer aperture which extends through a housing, the retainer aperture being adapted for receiving the extra length; wherein, the amount of the extra length secured by the retainer is incrementally adjustable to adjust the amount of pre-tension on the line; and moving the deflector to deflect and tighten the line between the two points.

18. The method of claim 17 wherein the step of retaining at least a portion of the extra length includes retaining the line with a pair of spaced apart retaining tabs which are adapted to grip and retain the line between the pair of retaining tabs.

19. The method of claim 17 wherein the step of retaining at least a portion of the extra length includes retaining the line with a pair of retainer slots, each retaining slot being sized so that the line fits snugly in each retainer slot to inhibit movement of the extra length through each retainer slot.

20. The method of claim 17 wherein the step of positioning the tightener on the line occurs after the step of securing the line at two points.

* * * * *